(12) United States Patent
Oniwa et al.

(10) Patent No.: US 8,326,489 B2
(45) Date of Patent: Dec. 4, 2012

(54) CONTROLLER OF ELECTRIC POWER-ASSIST STEERING SYSTEM

(75) Inventors: Yoshihiro Oniwa, Saitama (JP); Yasuo Shimizu, Saitama (JP); Shigeru Yamawaki, Saitama (JP); Kazushige Sugamata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 421 days.

(21) Appl. No.: 12/617,293

(22) Filed: Nov. 12, 2009

(65) Prior Publication Data
US 2010/0121531 A1   May 13, 2010

(30) Foreign Application Priority Data

Nov. 12, 2008   (JP) .................................. 2008-289496

(51) Int. Cl.
  *B62D 5/04*   (2006.01)
  *B62D 6/10*   (2006.01)
(52) U.S. Cl. .............................. 701/41; 180/446; 701/42
(58) Field of Classification Search .................... 701/41, 701/42; 180/443, 446
See application file for complete search history.

(56) References Cited

U.S. PATENT DOCUMENTS

| | | | | |
|---|---|---|---|---|
| 4,753,309 A | * | 6/1988 | Marumoto et al. | 180/446 |
| 5,097,918 A | * | 3/1992 | Daido et al. | 180/446 |
| 5,398,953 A | * | 3/1995 | Shimizu | 180/446 |
| 5,881,836 A | * | 3/1999 | Nishimoto et al. | 180/446 |
| 5,984,042 A | * | 11/1999 | Nishimoto et al. | 180/446 |
| 6,484,592 B2 | | 11/2002 | Sezaki | |
| 6,691,818 B2 | * | 2/2004 | Endo et al. | 180/446 |
| 7,136,732 B2 | * | 11/2006 | Shimizu et al. | 701/41 |
| 7,406,373 B2 | * | 7/2008 | Kubota et al. | 701/41 |
| 7,406,375 B2 | * | 7/2008 | Fujita et al. | 701/41 |
| 2002/0043423 A1 | | 4/2002 | Endo et al. | |
| 2005/0061577 A1 | * | 3/2005 | Shimizu et al. | 180/446 |
| 2006/0200290 A1 | * | 9/2006 | Chino et al. | 701/41 |
| 2007/0114084 A1 | * | 5/2007 | Huelser et al. | 180/170 |

(Continued)

FOREIGN PATENT DOCUMENTS

EP   0 350 817 A2   1/1990

(Continued)

OTHER PUBLICATIONS

Office Action for JP Application No. 2008-289496, mailed Jul. 17, 2012.

*Primary Examiner* — Joseph Rocca
*Assistant Examiner* — George Spisich
(74) *Attorney, Agent, or Firm* — Arent Fox LLP (57) ABSTRACT

The present invention discloses a controller of an electric power-assist steering system including a torque detector for detecting a torque applied with a steering wheel that steers a steering system; a steering status determining section for determining a steering status of either "turn" or "return" of a steering wheel; and a motor controlling unit for driving a motor in accordance with a target current value calculated based on at least a torque value from the torque detector and the steering status of either "turn" or "return" of the steering wheel from the steering status determining section, wherein the motor controlling unit sets a target current value right after a time when the steering status is switched between "turn" and "return" to be substantially equal to an actual current value right before a time when the steering status is switched between "turn" and "return".

2 Claims, 4 Drawing Sheets

U.S. PATENT DOCUMENTS

2009/0157261 A1* 6/2009 Yamazaki .................. 701/42

FOREIGN PATENT DOCUMENTS

| EP | 0 398 238 A1 | 11/1990 |
| EP | 0 779 199 A2 | 6/1997 |
| JP | 06-263050 A | 9/1994 |
| JP | 2001-106108 A | 4/2001 |
| JP | 3176899 B2 | 4/2001 |
| JP | 2001-296193 A | 10/2001 |
| JP | 4034294 B2 | 11/2007 |

* cited by examiner

CONTROLLER OF ELECTRIC POWER-ASSIST STEERING SYSTEM

CROSS-REFERENCE TO RELATED APPLICATION

This application claims the foreign priority benefit under 35 U.S.C. §119 of Japanese Patent Application No. 2008-289496 filed on Nov. 12, 2008, the disclosure of which is incorporated herein by reference.

BACKGROUND OF THE INVENTION

1. Field of the Invention

The present invention relates to a controller of an electric power-assist steering system that provides steering assist by using assist torque with a motor, more specifically to a controller of an electric power-assist steering system that utilizes hysteresis of assist torque with a motor, so as to better steering feeling.

2. Description of the Related Art

An electric power-assist steering system is a steering assist system that generates assist torque with a motor in accordance to magnitude of steering torque of a vehicle, and transmits this assist torque to a steering system, thereby to reduce steering force of a driver when the driver steers a steering wheel. In such an electric power-assist steering system, a drive current command value for a motor is calculated by subtracting a torque current correction value defined depending on the steering torque of the steering wheel from a base current command value. In this manner, since the motor provides a steering wheel with an appropriate assist torque having hysteresis depending on the steering speed, a preferable steering feeling can be realized (see JP 3176899 B, for example). However, this scheme defines a torque current correction value depending on the steering speed of the steering wheel, and the steering speed thereof may become zero when the steering wheel is maintained at a constant steering angle while the vehicle runs in a curve section, for example. In this case, the torque current correction value becomes zero, so that the hysteresis width of the assist torque with the motor becomes decreased, resulting in deterioration of steering feeling.

To address this problem, there has been disclosed a technique to perform a torque current correction even when the steering speed becomes zero, so as to increase the hysteresis width of an assist torque with a motor to better steering feeling (see JP 4034294 B, for example). This technique determines whether the status of the steering wheel is "turn" or "return" based on a relation between the orientation of the steering torque (sign) and the orientation of the rotational rate of the motor (sign). Specifically, it is determined that the status of the steering wheel is "turn" if the orientation of the steering torque (sign: + or −) agrees with the orientation of the rotational speed of the motor (sign: + or −), or and it is determined that the status of the steering wheel is "return" if the orientation of the steering torque (sign: + or −) disagrees with the orientation of rotational speed of the motor (sign: + or −). In other words, it is determined that the steering status is "turn" when the motor torque (the assist torque with the motor) acts as a steering assist, and it is determined that the steering status is "return" when the motor torque applies an action reversal to the steering assist action. And the torque current correction value is switched depending on the steering status of either "turn" or "return". At this time, when switching the steering status between "turn" and "return", the torque current correction value is defined to be zero if the steering status is "turn", and is defined not to be zero if the steering status is "return". The above control increases the hysteresis width of the assist torque with the motor, thereby to better steering feeling.

However, in such a technique of JP 4034294 B, when the status of the steering wheel is switched between "turn" and "return", the torque current correction value drastically changes between a value of zero (0) and a value other than zero (±α), thus the drive current command value of the motor also drastically changes in a discontinuous way. Consequently, the steering torque significantly changes when the status of the steering wheel is switched between "turn" and "return", resulting in deterioration of steering feeling.

To address the above problem, the present invention has an object to provide a controller of an electric power-assist steering system in which the hysteresis is enhanced to prevent a drastic change of a drive current command value for a motor even at the time of switching the status of the steering wheel between "turn" and "return", realizing preferable steering feeling without a great variation of steering torque.

SUMMARY OF THE INVENTION

One aspect of the present invention provides a controller of an electric power-assist steering system including a torque detector for detecting a torque applied with a steering wheel that steers a steering system; a steering status determining section for determining a steering status of either "turn" or "return" of a steering wheel; and a motor controlling unit for driving a motor in accordance with a target current value calculated based on at least a torque value from the torque detector and the steering status of either "turn" or "return" of the steering wheel from the steering status determining section, wherein the motor controlling unit sets a target current value right after a time when the steering status is switched between "turn" and "return" to be substantially equal to an actual current value right before a time when the steering status is switched between "turn" and "return".

In such a configuration, at the moment when the steering status is switched between "turn" and "return", the target current (the drive current) does not change, so that a drastic change of the assist torque with the motor can be prevented. Accordingly, the steering feeling can be maintained in a preferable manner when the status of the steering wheel is switched between "turn" and "return".

In the above controller of an electric power-assist steering system of the present invention, when the steering status determined by the steering status determining section is switched from "turn" to "return", the motor controlling unit controls the target current value not to be more than the actual current value of the "turn" status right before a time when the steering status is switched to "return", and when the steering status determined by the steering status determining section is switched from "return" to "turn", the motor controlling unit controls the target current value not to be less than the actual current value of the "return" status right before a time when the steering status is switched to "turn".

The torque detector may preferably be a magnetostrictive torque sensor.

Other features and advantages of the present invention will become more apparent from the following detailed description of the invention when taken in conjunction with the accompanying exemplary drawings.

DETAILED DESCRIPTION OF THE PREFERRED EMBODIMENT

Outline of Embodiment

A controller of an electric power-assist steering system according to an embodiment of the present invention limits a drive current command value (also referred to as a "target current value") not to be greater than the drive current command value of the "turn" status right before changing to "return", when the status of the steering wheel changes from "turn" to "return". Alternatively, the controller of the electric power-assist steering system limits the drive current command value (the target current value) not to become smaller than the drive current command value of the "return" status right before changing to "turn" when the status of the steering wheel changes from "return" to "turn". Thus, the drive current command value (the target current value) does not drastically change when the status of the steering wheel changes between "turn" and "return", so that it is possible to prevent a drastic change in the steering torque, and also to perform a hysteresis control that realizes a preferable steering feeling. Specifically, when the status of the steering wheel is changed from "turn" to "return" or from "return" to "turn", the drive current command value is limited not to become greater or smaller than that before the status change, thereby to maintain the drive current command value right before the status of the steering wheel is changed between "turn" and "return". Thus, continuousness of the drive current command value in the hysteresis can be maintained, resulting in realizing a preferable steering feeling.

Embodiment

Hereinafter, detailed descriptions will be provided on the controller of the electric power-assist steering system of the present invention with reference to the drawings. First, descriptions will be provided on the electric power-assist steering system applied to the embodiment of the present invention.

(Electric Power-Assist Steering System)

Figure 1:
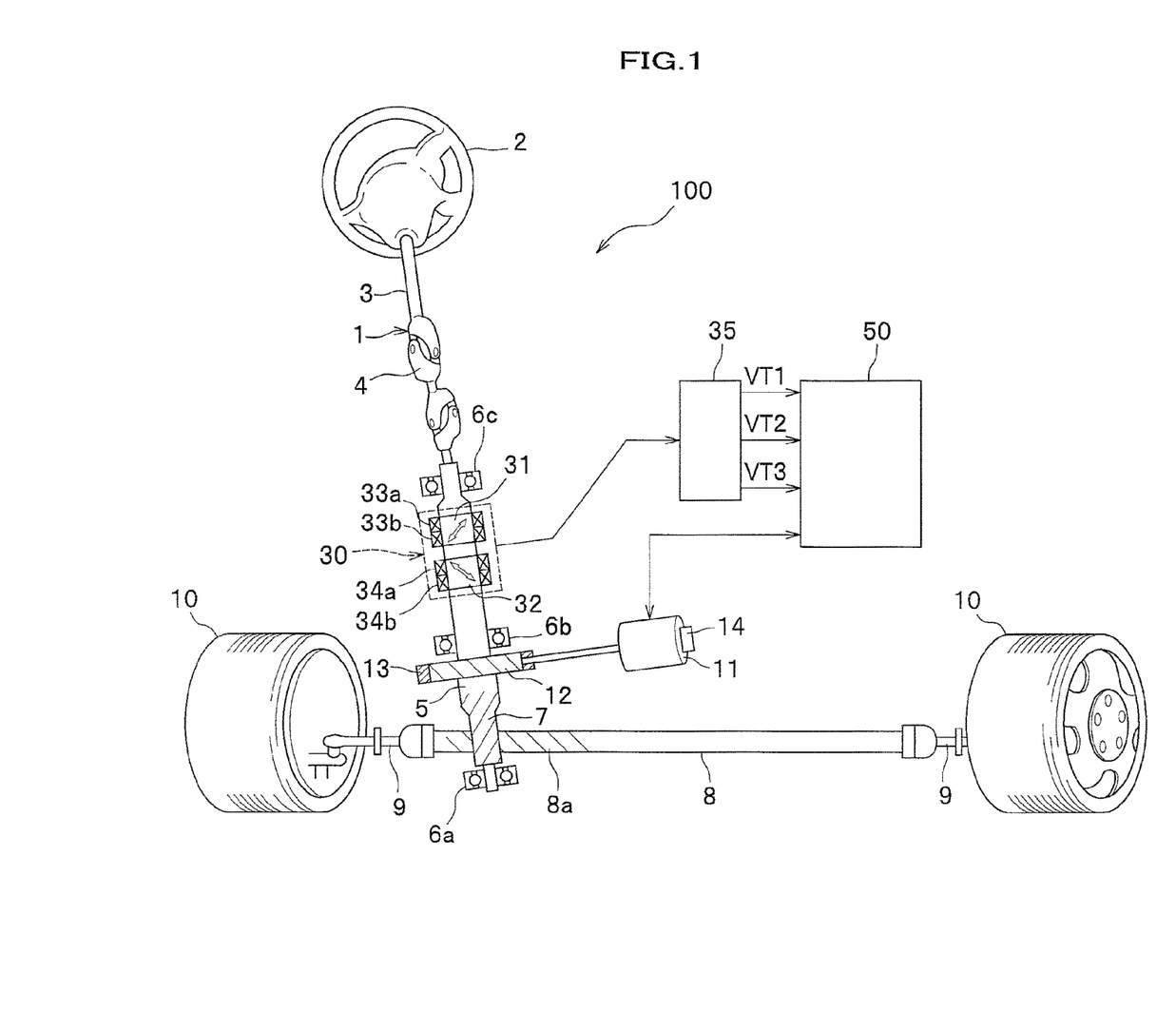
FIG. 1 is a schematic diagram of the electric power-assist steering system according to the embodiment of the present invention.

FIG. 1 is a schematic diagram of the electric power-assist steering system according to the embodiment of the present invention. As shown in FIG. 1, the electric power-assist steering system 100 for a vehicle includes a steering shaft 1 coupled to a steering wheel (steering means) 2. The steering shaft 1 includes a main steering shaft 3 integrally formed with the steering wheel 2 and a pinion shaft 5 provided with a pinion 7 of a rack & pinion mechanism, both of which are coupled to each other via a universal joint 4.

The pinion shaft 5 is supported at lower, middle and upper portions thereof with bearings 6a, 6b and 6c, respectively, and the pinion 7 is provided at the lower end of the pinion shaft 5. The pinion 7 is meshed with a rack gear 8a of a rack shaft 8 that reciprocatingly moves in the lateral direction of a vehicle body, and the right and left front wheels 10 that act as steered wheels are coupled at each end of the rack shaft 8 via a tie rod 9. In such a structure, an ordinary rack & pinion type steering operation can be performed when steering the steering wheel 2, so as to steer the right and left front wheels 10 to change the running direction of the vehicle. The rack shaft 8, the rack gear 8a and the tie rod 9 constitutes a steering mechanism.

The electric power-assist steering system 100 includes the motor 11 for providing an assist steering force (the assist torque) to reduce a steering force by a driver through the steering wheel 2. A worm gear 12 is meshed with a worm wheel gear 13 provided below the bearing 6b at the middle portion of the pinion shaft 5.

Between the bearing 6b at the middle portion and the bearing 6c at the upper portion, there is provided a magnetostrictive torque sensor (also referred to as a "torque detector") 30 for detecting a torque based on the change in magnetic property due to magnetostriction. As shown in FIG. 1, this magnetostrictive torque sensor 30 mainly includes first and second magnetostrictive films 31, 32 that are provided entirely around the outer circumference of the pinion shaft 5, first and second detecting coils 33a, 33b disposed opposing the first magnetostrictive film 31, third and forth detecting coils 34a, 34b disposed opposing the second magnetostrictive film 32, and a detection circuit 35 that is connected to the first to forth detecting coils 33a to 34b.

The first and second magnetostrictive films 31, 32 are a metal film of material having a magnetic permeability that greatly changes depending on the magnetostriction, such as alloy film of Ni—Fe formed around the outer circumferential surface of the pinion shaft 5, using a plating method, for example. The first magnetostrictive film 31 has magnetic anisotropy at a 45 degree gradient relative to the axis line of the pinion shaft 5, and the second magnetostrictive film 32 has magnetic anisotropy at a 90 degree gradient relative to the magnetic anisotropy of the first magnetostrictive film 31. In other words, the first and second magnetostrictive films 31, 32 have its magnetic anisotropy at an approximately 90 degree relative to each other.

The first and second detecting coils 33a, 33b are concentrically provided around the first magnetostrictive film 31 with a predetermined clearance to the first magnetostrictive film 31. Similarly, the third and fourth detecting coils 34a, 34b are concentrically provided around the second magnetostrictive film 32 with a predetermined clearance to the second magnetostrictive film 32.

Since each magnetic anisotropy of the first and second magnetostrictive films 31, 32 is provided in the above manner, in the state of steering torque acting on the pinion shaft 5 by steering the steering wheel 2, compression force is applied to one of the first and second magnetostrictive films 31, 32, and tension is applied to the other thereof. Accordingly, the magnetic permeability of the one magnetostrictive film (the first magnetostrictive film 31, for example) is increased and the magnetic permeability of the other magnetostrictive film (the second magnetostrictive film 32, for example) is decreased. At this time, inductance of one pair of the detecting coils (the first and second detecting coils 33a and 33b, for example) provided around the outer circumference of the one magnetostrictive film (the first magnetostrictive film 31, for example) is increased, and inductance of the other pair of the detecting coils (the third and fourth detecting coils 34a and 34b, for example) provided around the outer circumference of the other magnetostrictive film (the second magnetostrictive film 32, for example) is decreased.

The detection circuit 35 detects change in inductance of each of the detecting coils 33a, 33b, 34a, 34b, and detected information is converted into fault detection signals VT1, VT2 and a torque signal VT3, and these signals are output to ECU (also referred to as a "controller") 50.

The ECU 50 calculates the target current value (i.e. the drive current command value for the motor 11) based on the torque signal VT3 (also referred to as a "steering torque") output from the detection circuit 35, a motor rotation speed from the rotation speed detector 14 that detects rotation speed of the motor 11, and a vehicle speed from the speed detector (not shown) that detects a running speed of a vehicle. The motor 11 is controlled in such a manner that a value of a drive current flowing to the motor 11 agrees with the calculated target current value, thereby to provide a desired assist torque for the motor 11 so as to reduce steering force by the steering wheel 2.

Specifically, the assist steering force (the assist torque) based on the rotation torque of the motor 11 acts on the pinion shaft 5 that is coupled to the steering shaft 1 via the torque transmitter including the worm gear 12 and the worm wheel gear 13, and then is transmitted through the rack & pinion mechanism to the rack shaft 8. As driven in the above mentioned manner, the motor 11 generates assist torque, which reduces the steering force applied to the steering wheel 2 by a driver.

(Controller)

Figure 2:
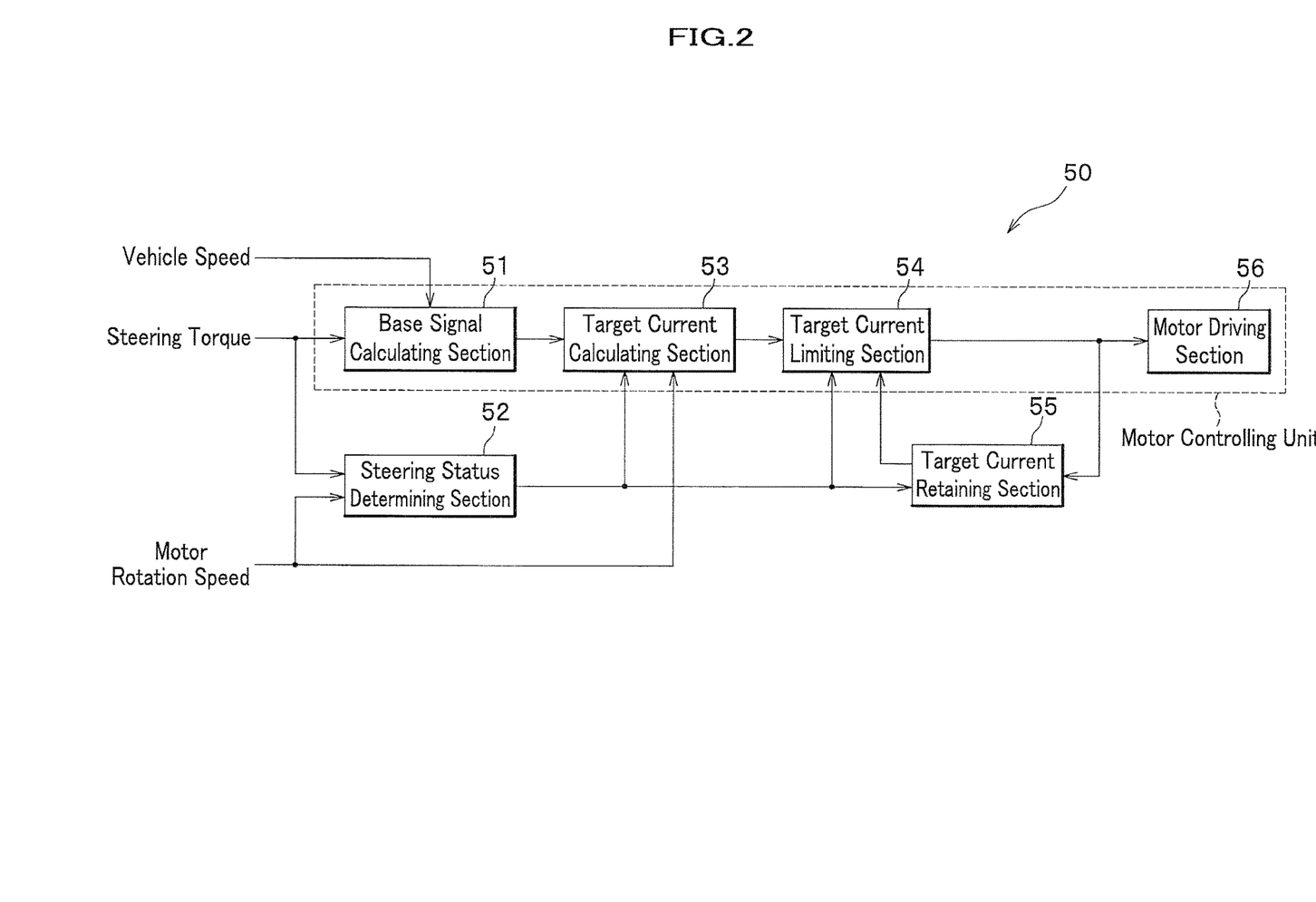
FIG. 2 is a block diagram showing an inner configuration of a controller of the electric power-assist steering system of FIG. 1.

Detailed descriptions will be provided on a drive control for the motor 11 by the ECU 50, which is a controller of the electric power-assist steering system 100, with reference to FIG. 2. FIG. 2 is a block diagram showing an inner configuration of the controller (ECU 50) of the electric power-assist steering system 100 of FIG. 1.

First, the configuration of the controller (ECU 50) of FIG. 2 will be described.

As shown in FIG. 2, the ECU 50 includes a base signal calculating section 51, a steering status determining section 52, a target current calculating section 53, a target current limiting section 54, a target current retaining section 55 and a motor driving section 56. The base signal calculating section 51 calculates a base signal based on the steering torque detected by the torque detecting section (the magnetostrictive torque sensor 30 of FIG. 1) and the vehicle speed. The steering status determining section 52 determines the steering status of either "turn" or "return" based on the steering torque and the motor rotation speed detected by the rotation speed detector 14 of FIG. 1. The target current calculating section 53 calculates a target current value by correcting a base signal using a different correction value depending on the steering status between "turn" and "return" determined by the steering status determining section 52. The target current limiting section 54 limits a magnitude of the target current value newly calculated by the target current calculating section 53 by using the target current value (also referred to as the "actual current value") right before the steering status changes, which is retained on the target current retaining section 55. The target current retaining section 55 retains the target current value (the actual current value) right before the steering status is switched when the steering status is switched between "turn" and "return". The motor driving section 56 controls the motor 11 in such a manner that a value of the current flown to the motor 11 agrees with the target current value. Note that a motor controlling unit is embodied by implementing the base signal calculating section 51, the target current calculating section 53, the target current limiting section 54 and the motor driving section 56.

The vehicle speed from the speed detector not shown, and the steering torque (the torque signal TV3) sent from the magnetostrictive torque sensor 30 via the detection circuit 35 of FIG. 1 are input to the base signal calculating section 51. Further, the steering torque (the torque signal VT3) and the rotation speed (the motor rotation speed) of the motor 11 send from the rotation speed detector 14 of FIG. 1 are input to the steering status determining section 52.

Next, detailed descriptions will be provided on each function of the above-mentioned elements of the controller of the electric power-assist steering system 100. The base signal calculating section 51 calculates a base signal underlying the target current value (the drive current command value) for the motor 11. The steering status determining section 52 determines the steering status between "turn" and "return" of the steering system based on the steering torque and the motor rotation speed that are input. If the orientation of the steering torque (sign: + or −) agrees with the orientation of the rotation speed of the motor 11 (motor rotation speed) (sign: + or −), the status is determined to be "turn"; and if the orientation of the steering torque (sign: + or −) disagrees with the orientation of the rotation speed of the motor 11 (sign: + or −), or the status is determined to be "return".

Figure 5:
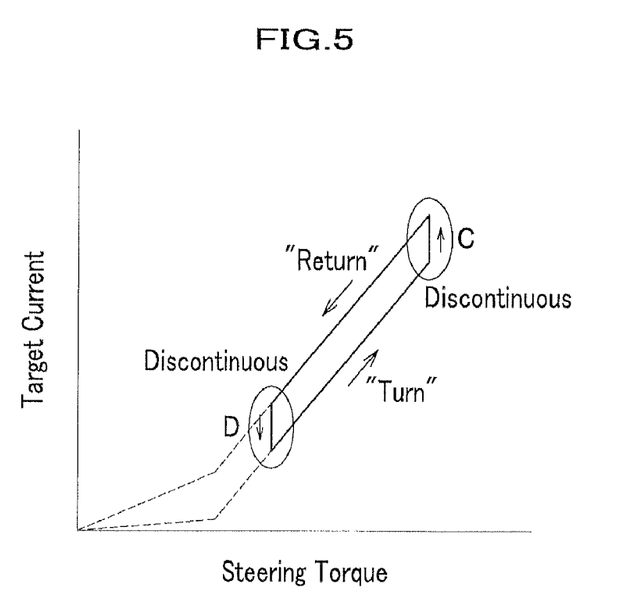
FIG. 5 shows hysteresis in a relation between a steering torque and the target current, controlled by a controller of an electric power-assist steering system of JP 4034294 B.

The target current calculating section 53 corrects the base signal by using a different correction value depending on the steering status of either "turn" or "return", in a similar way to JP 4034294 B. As similar to JP 4034294 B, the target current calculating section 53 corrects the base signal of the "turn" status by using a correction value (correction signal) of "0" if the steering speed is "0". Meanwhile, the target current calculating section 53 corrects the base signal of the "return" status by using a correction value (correction signal) other than "0" even if the steering speed is "0" (see Paragraphs [0015] to [0025], particularly Paragraphs [0018] and [0024] of JP 4034294 B). Thus, as shown in FIG. 5, the correspondence relation of "the target current and the steering torque (the assist torque)" has hysteresis in which the steering status has a different path between "turn" and "return", and the target current value changes drastically at the moment of switching the steering status between "turn" and "return".

To be explained complementarily, if the steering speed is "0", the correction value of the "turn" status is "0", but the correction value of the "return" status is other than "0" (see Paragraph [0024] of JP 4034294 B). Thus, at the moment when the steering status is switched from "turn" to "return" (at the moment when the steering speed crosses "0"), the target current value calculated by the target current calculating section 53 drastically increases (the discontinuous part represented by the circle C of FIG. 5). Meanwhile, at the moment when the steering status is switched from "return" to "turn" (at the moment when the steering speed crosses "0"), the target current value calculated by the target current calculating section 53 drastically decreases (the discontinuous part represented by the circle D of FIG. 5).

Next, at the moment when the steering status is switched between "turn" and "return", the target current retaining section 55 retains the target current value (the drive current command value) right before the status switching, which is determined by the steering status determining section 52.

If the result determined by the steering status determining section 52 is the "turn" status, the target current limiting section 54 compares the target current calculated by the target current calculating section 53 to the retained target current value of the "return" status right before the status is switched to "turn". If the calculated target current value is smaller than the retained target current value, the target current limiting section 54 limits the current by replacing the present target current value with the retained target current value. Meanwhile, if the result determined by the steering status determining section 52 is the "return" status, the target current limiting section 54 compares the target current value calculated by the target current calculating section 53 to the retained target current value of the "turn" status right before the status is switched to "return". If the calculated target current value is smaller than the retained target current value, the target current limiting section 54 limits the current by replacing the present target current value with the retained target current value. The motor driving section 56 drives the motor 11 based on the target current value (the drive current command value) whose current magnitude is limited and output from the target current limiting section 54.

Figure 3:
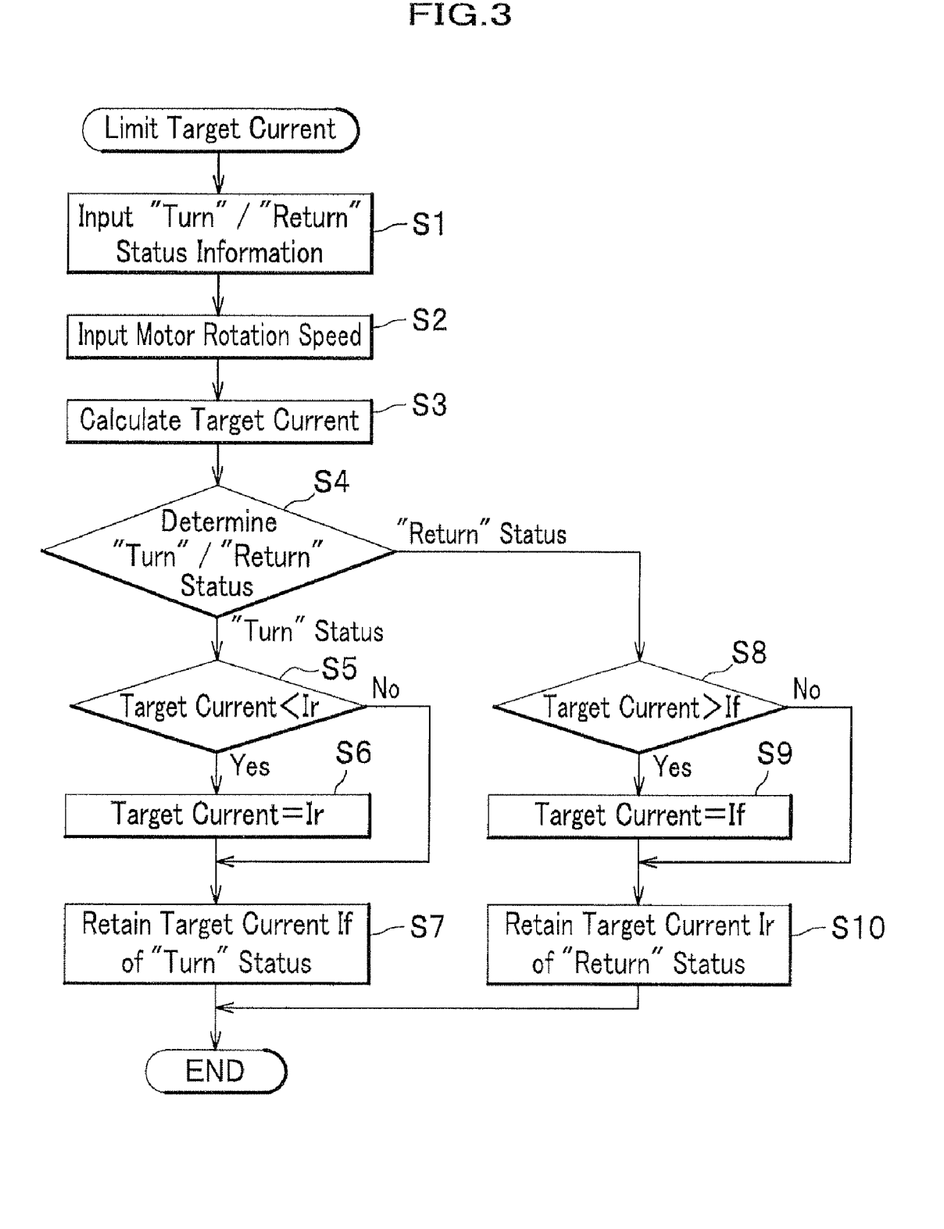
FIG. 3 is the flow chart showing operations of limiting a target current performed by the controller of the electric power-assist steering system of FIG. 2.

Next, an operation of the controller of the electric power-assist steering system 100 of FIG. 2 will be described with reference to a flow chart of FIG. 3. FIG. 3 is the flow chart showing operations of limiting the target current, performed by the controller of the electric power-assist steering system 100 of FIG. 2.

In FIG. 3, when the controller (ECU 50) of the electric power-assist steering system 100 limits the target current value (the driving current command value) for the motor 11, first, the target current calculating section 53 inputs the status information of either the "turn" or "return" status (Step S1). Then, the target current calculating section 53 inputs the motor rotation speed (Step S2). Then, the target current calculating section 53 corrects the base signal input from the base signal calculating section 51 by using a different correction value depending on the steering status of either "turn" or "return", which is determined based on the input motor rotation speed, etc., so as to calculate the target current value (Step S3). As such, the relation between the target current and the steering torque having hysteresis as shown in FIG. 5 is obtained, in which the target current value drastically changes at the moment of switching the steering status between "turn" and "return" (at the moment when the steering speed becomes 0).

Next, the target current limiting section 54 determines whether the switched steering status determined by the steering status determining section 52 is "turn" or "return" (Step S4). If the status right after the status is switched is "turn", the target current limiting section 54 compares the target current value calculated by the target current calculating section 53 to the retained target current value Ir of the "return" status right before the status is switched to "turn" (Step S5). If the calculated target current value is smaller than the retained target current value Ir (the target value<Ir) (Yes at Step S5), this target current value is replaced with the retained target current value Ir, that is, the target current value=Ir (Step S6). The current is limited by using this target current value (i.e. the retained target current value Ir), and is output to the motor driving section 56, and also is retained on the target current retaining section 55 as the target current value of the "turn" status (the retained target current value If) (Step S7). If the target current value is not smaller than the retained target current value Ir at Step S5 (No at Step S5), this target current value is used as it is, and output to the motor driving section 56, and also is retained as the target current value of the "turn" status (the retained target current value If) on the target current retaining section 55 (Step S7).

Meanwhile, at Step S4, if the steering status right after the status is switched is "return", which is determined by the steering status determining section 52, the target current calculating section 53 compares the target value calculated by the target current calculating section 53 to the retained target current value If of the "turn" status right before the status is switched to "return" (Step S8). If the target current value is greater than the retained target current value If (the target value>If) (Yes at Step S8), this target current value is replaced with the retained target current value If, that is, the target current value=If (Step S9). The current is limited by using this target current value (i.e. the retained target current value If), and is output to the motor driving section 56, and is output to the motor driving section 56, and also is retained on the target current retaining section 55 as the target current value of the "return" status (the retained target current value Ir) (Step S10). At Step S8, if the target current value is not greater than the retained target current value If (No at Step S8), this target current value is used as it is, and is output to the motor driving section 56, and also is retained on the target current retaining section 55 as the target current value of the "return" status (the retained target current value Ir) (Step S10).

Figure 4:
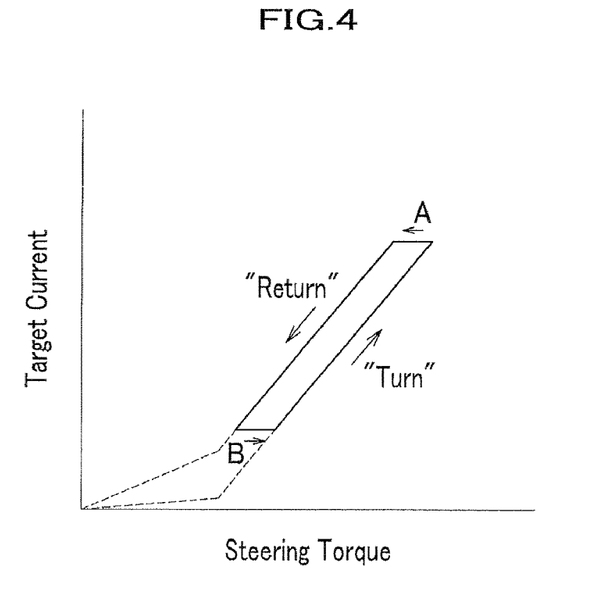
FIG. 4 shows hysteresis in a relation between a steering torque and the target current, controlled by the controller of the electric power-assist steering system of FIG. 2.

FIG. 4 shows the hysteresis in the relation between the steering torque and the target current, controlled by the controller of the electric power-assist steering system 100 of FIG. 2, and the horizontal axis represents the steering torque and the vertical axis represents the target current (i.e. the drive current command value of the motor 11). Specifically, the controller of the electric power-assist steering system 100 performs the control as shown in the flow chart of FIG. 3, so that the target current does not change at the moment of switching the steering status from "turn" to "return" (represented by the arrow A) (see Step S6), and the target current does not change at the moment of switching the steering status from "return" to "turn" (represented by the arrow B), either (see Step S9). That is, since the target current dose not change at the time of switching the steering status between "turn" and "return", a drastic change of the assist torque of the motor 11 can be prevented, thus the steering feeling is maintained in a preferable manner.

According to the controller of the electric power-assist steering system 100 of the embodiment of the present invention, the target current calculating section 53 corrects the base signal depending on the steering speed (the motor rotation speed) when the steering status of the steering wheel 2 is "turn", so that the correction value becomes "0" if the steering speed is "0". On the other hand, when the steering status is "return", the target current calculating section 53 corrects the base signal using the correction value depending on the steering speed, but the base signal is corrected using a correction value other than "0" although the steering speed is "0", thus the calculated target current value changes discontinuously at the time of switching the steering speed from "turn" to "return" and vice versa, that is, at the moment when the steering speed crosses the point "0". To address this discontinuous change, the target current retaining section 55 retains the target current value (the actual current value) right before the steering status is switched, and the target current limiting section 54 limits the magnitude of the target current value newly calculated by the target current calculating section 53 by using the target current value right before the steering status switching between "turn" and "return", thereby to make the limited target current value continuous at the time of switching the steering status, so as to prevent a drastic change of the steering torque. Accordingly, the preferable steering feeling can be maintained while handling the steering while 2.

<<Comparison>>

The technique, disclosed in JP 4034294 B whose assignee is the same as the present invention, corrects the torque current (the drive current of the motor) even if the steering speed (the motor rotation speed) is "0" so as to increase the hysteresis width, thereby to better the steering feeling. Specifically, the electric power-assist steering system of JP 4034294 B also determines the steering status of either "turn" or "return" by comparing the orientation (sign) of the steering torque and the orientation (sign) of the steering speed (the motor rotation speed). The current correction based on the steering speed is carried out by using a different correction value that is determined depending on the steering status of either "turn" or "return", and the switching means that is switched depending on the steering status between "turn" and "return" applies to the base signal command value a different correction value depending on the steering status between "turn" and "return". In the "return" status, the secondary correcting means applies a second correction value so that the correction value does not become 0 even when the steering speed is 0, thereby to provide the hysteresis. Note that the secondary correction value is not applied in the "return" status. As such, a different correction value is applied depending on the steering status between "turn" and "return", and the secondary correction value is applied only in the "return" status, thereby to increase the hysteresis width, as shown in FIG. 5.

FIG. 5 shows the hysteresis in a relation between the steering torque and the target current that are provided by the controller of the electric power-assist steering system of JP 4034294 B, in which the horizontal axis represents the steering torque and the vertical axis represents the target current (i.e. the drive current command value of the motor). In the controller of JP 4034294 B, when the steering speed crosses the value of "0" during the switching of the steering status between "turn" and "return", the correction value of the "turn" status is "0" but the correction value of the "return" status is other than "0". Consequently, as shown in FIG. 5, the current command value (the target current value) drastically changes when switching the steering status from "turn" to "return" (the arrow C) or from "return" to "turn" (the arrow D), so that the current command value becomes discontinuous. This discontinuousness causes a drastic change of the assist torque with the motor, so that the steering torque significantly changes and the steering feeling is deteriorated. Particularly, in an electric power-assist steering system using a magnetostrictive torque sensor, a drastic change of an assist torque may directly reach a driver due to delay of a detection response. To counter such a problem, the control method as described in the embodiment of the present invention controls the current command value (the target current value) not to change at the time when the steering status is switched between "turn" and "return", thereby to realize a preferable steering feeling.

According to the present invention, it is possible to make the drive current command value continuous, even in the relation between the motor torque and the drive current command value having the hysteresis when the status of the steering wheel changes between "turn" and "return". Accordingly, the drive current command value does not change drastically, thereby to realize a preferable steering feeling.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A controller of an electric power-assist steering system comprising:
    a torque detector for detecting a torque applied with a steering wheel that steers a steering system;
    a steering status determining section for determining a steering status of either turn or return of a steering wheel; and
    a motor controlling unit for driving a motor in accordance with a target current value calculated based on at least a torque value from the torque detector and the steering status of either turn or return of the steering wheel from the steering status determining section,
    wherein
    the motor controlling unit sets a target current value right after a time when the steering status is switched between turn and return to be substantially equal to an actual current value right before a time when the steering status is switched between turn and return; and
    when the steering status determined by the steering status determining section is switched from turn to return, the motor controlling unit controls the target current value not to be more than the actual current value of the turn status right before a time when the steering status is switched to return, and
    when the steering status determined by the steering status determining section is switched from return to turn, the motor controlling unit controls the target current value not to be less than the actual current value of the return status right before a time when the steering status is switched to turn.

2. The controller of an electric power-assist steering system according to the claim 1, wherein the torque detector comprises a magnetostrictive torque sensor.

* * * * *